Patented July 4, 1950

2,513,922

UNITED STATES PATENT OFFICE 2,513,922

PROCESS FOR PREPARING HYDROXY ETHYL MERCAPTO THIAZOLES

Paul M. Downey, Nitro, W. Va., assignor to Monsanto Chemical Company, St. Louis, Mo., a corporation of Delaware No Drawing. Application June 6, 1946, Serial No. 674,928

7 Claims. (Cl. 260—302)

The present invention relates to the condensation of mercapto thiazoles with ethylene oxide. More particularly, the present invention relates to the preparation of 2-hydroxy ethyl mercapto thiazoles.

The condensation with ethylene oxide of compounds containing a mercapto group easily results in the formation of polyethers. Thus, it is known to produce high molecular weight polyethers by condensation of mercaptans and thio phenols with ethylene oxide. While the mercapto thiazoles undergo some reactions characteristic of the aliphatic mercaptans and thio phenols, it was not apparent how the reaction could be controlled to produce the 2-hydroxy ethyl mercapto thiazole in good yield substantially free from polymers and other impurities.

In accordance with the present invention it has been discovered that condensation of ethylene oxide with a mercapto thiazole results nearly quantitatively in the formation of 2-hydroxy ethyl mercapto thiazole, providing that the reaction is carried out in an inert organic solvent. The particular solvent does not appear to be important so long as it reacts with neither of the reactants and is a solvent for both of them. On the other hand, reaction without a solvent results in large quantities of polyethers.

Since the reactions are effected most advantageously between 90–130° C., it is preferred to employ solvents which have boiling points above 90° C. Below 90° C. the quantity of ethylene oxide which remains in solution in most solvents is excessive and introduces either a troublesome problem of recovery or substantial loss of reagent. Above 130° C. the formation of decomposition products and polyethers becomes appreciable. However, within the range of 90–130° C. the formation of the 2-hydroxy ethyl mercapto thiazoles takes place smoothly and in most cases additional quantities of ethylene oxide will not enter into reaction in the presence of the solvent.

The mercapto thiazoles suitable for use in the present process are the compounds having a mercapto group attached in the 2 position to the thiazole ring.

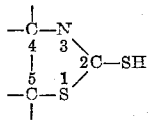

Typical examples comprise dihydro mercapto thiazole, methyl mercapto thiazole, ethyl mercapto thiazole, mercaptobenzothiazole, mercapto naphthothiazole, mercapto 4-phenol benzothiazole, mercapto chlorobenzothiazole, mercapto tolyl thiazole, and equivalents and analogues thereof.

Suitable solvents for the thiazoles and ethylene oxide include dioxane, mono chlorobenzene, ortho dichlor benzene, tetra chlor ethane, and diethyl carbitol.

The reactions may be carried out in the presence of catalytic materials, as for example activated carbon or traces of caustic soda, sodium methylate and the like, but this is optional. The reactions take place satisfactorily in the absence of any catalyst at all. The mercapto thiazole may simply be dissolved in a suitable solvent, the solution heated to the temperature suitable for the condensation and ethylene oxide passed into the hot solution. There is usually a small amount of insoluble by-product formed whereas the reaction product remains in solution so these impurities can be removed readily by filtering the solution before isolation of the product.

The following specific embodiments illustrate the invention in detail but are not to be taken as limitative of the invention.

Example I

Substantially 344 parts by weight of mercaptobenzothiazole was dissolved in 350 parts by weight of dioxane. A small amount of Nuchar or other absorptive carbon was added and ethylene oxide passed into the solution at 96–105° C. When ethylene oxide no longer continued to be absorbed, the black and small amounts of other insoluble material were filtered from the hot solution. The solvent was removed either by vacuum stripping or washing and drying and the residue heated up to 90° C. under 5 mm. vacuum. The product consisted of a light colored heavy viscous oil which set to a waxy solid on standing. After recrystallization from benzene the product melted at 52.5–54.5° C.

When the solvent was eliminated additional ethylene oxide condensed with the mercaptobenzothiazole producing a dark viscous liquid.

Example II

Substantially 150 parts by weight of a good grade of mercaptobenzothiazole was dissolved in 150 parts by weight of diethyl carbitol and ethylene oxide bubbled into the solution at 125–130° C. until there was no more absorption. The charge was filtered from any insolubles and the solvent stripped off by distillation under reduced pressure. A good grade of 2-hydroxy ethyl mercaptobenzothiazole was obtained as a residue without further purification. The yield was practically quantitative.

Further purification was effected by dissolving the product in hot carbon tetrachloride. The oil which separated on cooling crystallized upon further standing, M. P. 52.5–54.5°.

*Example III*

Substantially 119 parts by weight of mercapto thiazoline was dissolved in 150 parts by weight of dioxane and 1.2 parts by weight of powdered potassium hydroxide added to the solution. Ethylene oxide was then bubbled in until approximately the theoretical quantity had been absorbed. The flow of ethylene oxide into the reaction medium was begun when the temperature was 78° C. After about thirty minutes the temperature had been increased to 98° and was kept at about 90° C. or above thereafter. The charge was filtered and the solvent stripped off by distillation under reduced pressure, leaving a light yellow viscous oil which partially solidified on standing. The product was soluble in acetone, benzene, alcohol and dilute hydrochloric acid but insoluble in dilute caustic soda and petroleum ether. Analysis for nitrogen and sulfur indicated that the product was essentially 2-hydroxy ethyl mercapto thiazoline.

When the reaction was carried out in the absence of a solvent nearly two mols of ethylene oxide condensed per mol of mercapto thiazoline.

*Example IV*

A solution of 4-phenyl mercaptobenzothiazole in dioxane was prepared by dissolving 121.5 parts by weight of the mercapto thiazole (substantially 0.5 molecular proportions) in 160 parts by weight of dioxane. 1.2 parts by weight of powdered potassium hydroxide was added and ethylene oxide passed in at 97–103.5° C. until 22.0 parts by weight (0.5 molecular proportion) had been absorbed. The hot solution was filtered from insolubles and the solvent stripped off under reduced pressure. The residue was a thick reddish brown liquid. Nitrogen calculated for $C_{15}H_{13}NOS_2$ 4.87% found 4.73%.

Variations in the particular procedures described will be apparent and are within the scope of the invention. While it is advantageous that reaction under pressures greater than atmospheric is unnecessary, it is of course possible to employ lower boiling solvents under slight positive pressures or even to carry out the reaction at lower temperatures for longer periods of time. This invention is limited solely by the claims attached hereto as part of the present specification.

What is claimed is:

1. The process of making 2-hydroxy ethyl mercapto thiazoles which comprises heating ethylene oxide with a mercapto thiazole in an inert organic solvent.

2. The process of making 2-hydroxy ethyl mercapto thiazoles which comprises heating ethylene oxide with a mercapto thiazole at 90–130° C. in an inert organic solvent.

3. The process of making a 2-hydroxy ethyl mercapto arylene thiazole which comprises heating ethylene oxide with a mercapto arylene thiazole at 90–130° C. in an inert organic solvent.

4. The process of making 2-hydroxy ethyl mercaptobenzothiazole which comprises heating ethylene oxide with mercaptobenzothiazole in an inert organic solvent.

5. The process of making 2-hydroxy ethyl mercaptobenzothiazole which comprises heating ethylene oxide with mercaptobenzothiazole in an inert organic solvent at 90–130° C.

6. The process of making 2-hydroxy ethyl mercaptobenzothiazole which comprises heating ethylene oxide with mercaptobenzothiazole in diethyl carbitol at 90–130° C.

7. The process of making 2-hydroxy ethyl mercapto thiazoline which comprises heating ethylene oxide with mercapto thiazoline in an inert organic solvent at 90–130° C.

PAUL M. DOWNEY.

REFERENCES CITED

The following references are of record in the file of this patent:

UNITED STATES PATENTS

| Number | Name | Date |
| --- | --- | --- |
| 2,070,523 | Clifford | Feb. 9, 1937 |
| 2,129,709 | Schuette | Sept. 13, 1938 |
| 2,402,878 | Doumani | June 25, 1946 |

OTHER REFERENCES

Chemical Abstracts, vol. 29, p. 3979.
Chemical Abstracts, vol. 36, p. 753.